Nov. 15, 1932.  C. P. TRURAN  1,888,149
MOTION TRANSMISSION FOR MOTOR VEHICLES
Filed Nov. 16, 1931
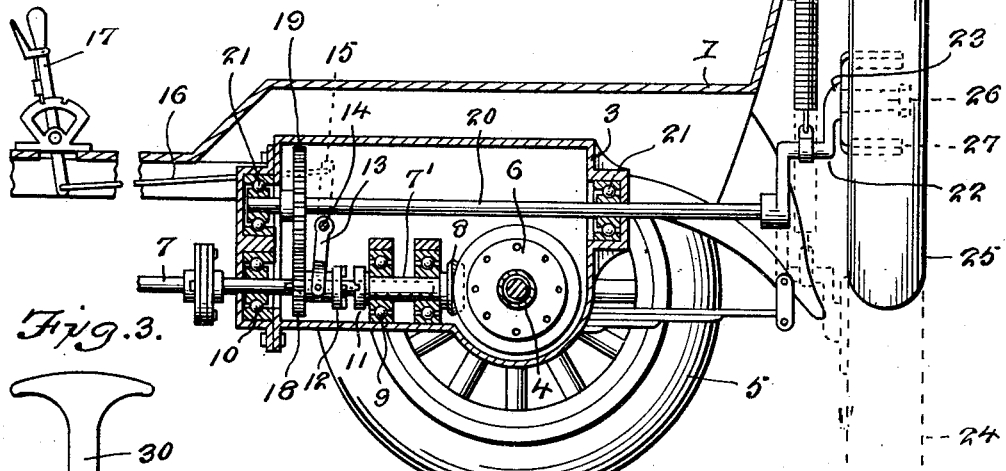
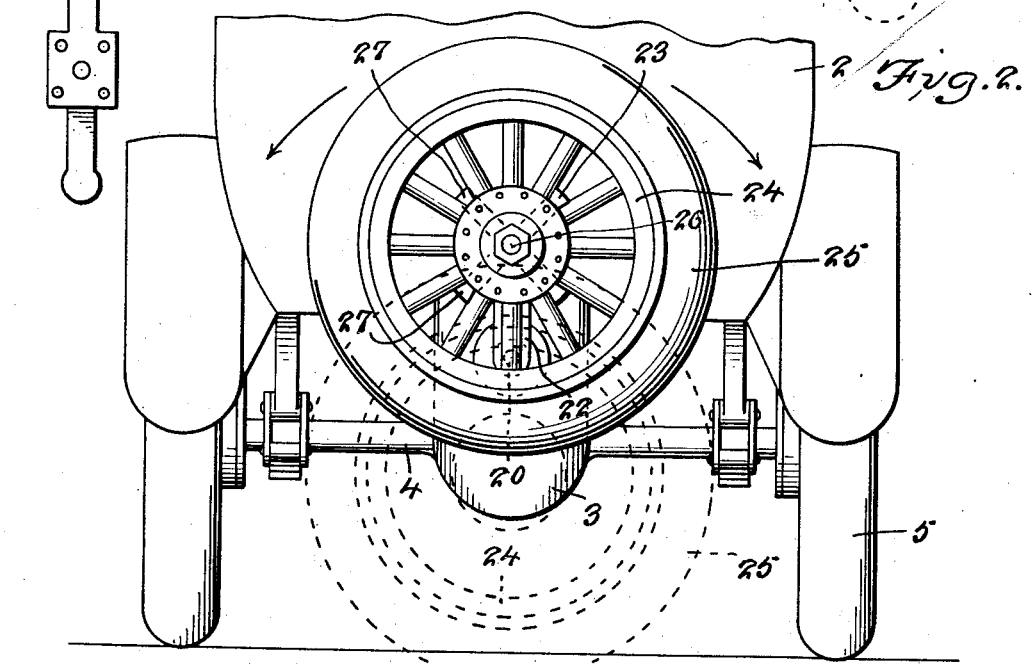
Clifford P. Truran
INVENTOR
BY Victor J. Evans & Co.
ATTORNEY
WITNESS:

Patented Nov. 15, 1932

1,888,149

UNITED STATES PATENT OFFICE

CLIFFORD P. TRURAN, OF BREWSTER, NEW YORK

MOTION TRANSMISSION FOR MOTOR VEHICLES

Application filed November 16, 1931. Serial No. 575,407.

This invention relates to a motion transmission for motor vehicles and has for the primary object, the provision of a device of the above stated character whereby a vehicle by its motive power may be moved sideways at the will of the operator, so as to facilitate parking of the vehicle or extracting the latter from a stalled position.

With this and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary sectional view illustrating the rear portion of the motor vehicle with my invention applied thereto.

Figure 2 is a rear elevation illustrating the means for imparting a lateral or sidewise movement to the vehicle.

Figure 3 is a plan view illustrating a shoe.

Referring in detail to the drawing, the numeral 1 indicates a fragmentary portion of a motor vehicle including the usual body 2, rear axle housing 3 having associated therewith the rear axles 4 to which are secured the rear wheels 5. The axle housing 3 has the usual differential 6 connected to a power shaft 7 by a pinion 8. The drive shaft 7 includes a sectional shaft journalled in bearings 9 and 10 of the housing and the section 7' has a clutch element 11 secured thereto while the other section of the drive shaft has splined thereto a clutch element 12 adapted to be brought into engagement with the clutch element 11 for the purpose of establishing driving connection between the sections of the drive shaft. The clutch element 12 is pivoted to a shifting fork 13 pivotally mounted as shown at 14 and provided with an arm 15 to which an operating rod 16 is pivoted. The operating rod 16 is pivoted to an operating lever 17 mounted in convenient reach of the operator of the vehicle and may be positioned to engage and disengage the clutch element 12 with the clutch element 11. The clutch element 12 has secured thereto a pinion 18 adapted to be moved into and out of mesh with a gear 19 secured to a shaft 20. When the clutch element 12 is disengaged from the clutch element 11, the pinion 18 is in mesh with the gear 19 for the purpose of rotating the shaft 20. The shaft 20 is journalled in bearings 21 of the housing 3 and extends rearwardly of the rear wheels 5 and the body 2 of the motor vehicle and has secured thereto a crank arm 22 terminating into an attaching portion 23 to which an extra wheel 24 and its tire 25 may be secured. The attaching portion 23 includes an axle shaped element 26 to extend through the hub of the wheel and receive a nut thereon. Arms 27 are formed on the attaching portion 23 and fit between certain spokes of the extra wheel 24 for the purpose of securing the wheel against rotation relative to the crank 22. The crank 22 is normally supported in a raised position by a coiled spring 28 attached thereto and to a bracket 29 secured to the body of the vehicle.

When it is desired to move the vehicle sidewise, the operating lever 17 is positioned to disengage the clutch element 12 from the clutch element 11 and bring the pinion 18 in mesh with the gear 19. The driving connection between the power source of the vehicle and the rear wheels is then interrupted and the shaft 20 is rotated and due to the crank 22, the extra wheel and its tire are brought into and out of engagement with the ground which causes an elevation of the vehicle and at the same time a sidewise movement thereof so that the rear end of the vehicle may be shifted laterally for facilitating parking or for aiding in extracting or moving the rear wheels out of ruts.

If desired a shoe 30 may be secured to the attaching member 23 to act in the place of the extra wheel and tire. Also the device may be duplicated or arranged to operate on the front end of the vehicle by extending the shaft 20 forwardly of the forward end of the vehicle and applying a shoe thereto.

While I have shown and described the preferred embodiment of my invention, it will be understood that minor changes in construction, combination and arrangement of parts may be made without departing from the spirit and scope of my invention, as claimed.

Having thus described my invention, what I claim is:

1. A motion transmission for a motor vehicle comprising a shaft journalled to a vehicle and extending beyond one end thereof, means for connecting and disconnecting the shaft to power means of the vehicle, a crank secured to the shaft, yieldable means connected to the crank for normally supporting the same in a given position, and means carried by the crank to engage and disengage with the ground during the rotation of the shaft for elevating and moving the vehicle laterally.

2. A motion transmission for a motor vehicle comprising a shaft journalled to a vehicle and extending beyond one end thereof, means for connecting and disconnecting the shaft to power means of the vehicle, a crank secured to the shaft, yieldable means connected to the crank for normally supporting the same in a given position, and an extra wheel secured to the crank to engage and disengage with the ground by the rotation of the shaft for elevating and moving the vehicle laterally.

3. A motion transmission for a motor vehicle comprising a shaft journalled to a vehicle and extending beyond one end thereof, means for connecting and disconnecting the shaft to power means of the vehicle, a crank secured to the shaft, yieldable means connected to the crank for normally supporting the same in a given position, and a shoe secured to the crank to engage and disengage with the ground by the rotation of the shaft for elevating and moving the vehicle laterally.

In testimony whereof I affix my signature.

CLIFFORD P. TRURAN.